United States Patent [19]
Tondre et al.

[11] Patent Number: 5,908,887
[45] Date of Patent: Jun. 1, 1999

[54] POLYESTER COMPOSITIONS

[75] Inventors: Stephen L. Tondre, Fremont; Alan S. Yeung, Redwood City; Viktors Jansons, Los Gatos, all of Calif.

[73] Assignee: Raychem Corporation, Menlo Park, Calif.

[21] Appl. No.: 08/275,174

[22] Filed: Jul. 14, 1994

Related U.S. Application Data

[63] Continuation-in-part of application No. 08/004,749, Jan. 14, 1993, abandoned, and application No. PCT/US94/00624, Jan. 13, 1994.

[51] Int. Cl.$^6$ .............................. C08K 5/04; C08K 3/32; C08K 3/18; B32B 15/08
[52] U.S. Cl. .......................... 524/399; 524/414; 524/417; 524/430; 428/458
[58] Field of Search ................................ 524/430, 399, 524/414, 417; 428/458

[56] References Cited

U.S. PATENT DOCUMENTS

| | | | |
|---|---|---|---|
| 4,536,531 | 8/1985 | Ogawa et al. | 524/135 |
| 5,081,176 | 1/1992 | Hamilton | 524/430 |

FOREIGN PATENT DOCUMENTS

| | | | |
|---|---|---|---|
| 51-117749 | 10/1975 | Japan | C08L 67/02 |
| 5-222273 | 8/1993 | Japan | C08L 67/02 |

OTHER PUBLICATIONS

Derwent Abstract of Japanese Patent Publication No. 51–117749.
Abstract from Database WPI, Derwent Publications Ltd., London, GB; AN 91–130213 & JP,A,03 070 767 (Toray Ind Inc), Mar. 26, 1991.
Abstract from Database WPI, Derwent Publications Ltd., London, GB; AN 90–339165 & JP,A,02 245 057 (Toray Ind Inc), Sep. 28, 1990.
Abstract from Database WPI, Derwent Publications Ltd., London, GB, AN 80–10385c & JP,A,54 163 945 (Teijin KK), Dec. 27, 1979.
International Search Report for PCT/US95/08332 dated Oct. 16, 1995.

Primary Examiner—Kriellion S. Morgan
Attorney, Agent, or Firm—Timothy H. P. Richardson; Marguerite E. Gerstner; Herbert G. Burkard

[57] ABSTRACT

Novel polyester compositions, particularly suitable for the insulation of wires, contain an aromatic polyester, especially polybutylene terephthalate. The presence of certain tin (II) compounds, for example tin (II) oxide, oxalate, phthalate, pyromellitate, or phosphite, reduces the flammability and smoke generation of such compositions. The presence of an aliphatic polyester, and optionally a thermoplastic elastomer, can also improve the properties of such compositions.

12 Claims, 1 Drawing Sheet

POLYESTER COMPOSITIONS

CROSS REFERENCE TO RELATED APPLICATIONS

This application is a continuation-in-part of U.S. application Ser. No. 08/004,749 filed Jan. 14, 1993 abandoned, by Tondre and Yeung, and International Application No. PCT/US94/00624 filed Jan. 13, 1994, by Raychem Corporation and by Tondre and Yeung, and designating U.S. and other countries. The entire disclosure of each of those applications is incorporated by reference herein for all purposes.

BACKGROUND OF THE INVENTION

1. Field of the Invention

This invention relates to polyester compositions.

2. Introduction to the Invention

Many polyester compositions are known, including compositions which can be melt-shaped, e.g. melt-extruded around a conductor to provide an insulating coating. The physical and electrical properties of such polyester compositions are of course very important, and, for many uses, include flammability and smoke generation when burned. A great variety of polyester compositions have, therefore, been used or proposed for use, particularly as insulating coatings on wires. Reference may be made for example to U.S. Pat. Nos. 2,167,278, 3,671,487, 3,835,089, 4,048,128, and 4,332,855 and the United States Patents cited as references on page 1 thereof; copending, commonly assigned U.S. patent application Ser. No. 07/537,558, filed Jun. 13, 1990 (MP1360); European Patent Publication No. 0057415; and Japanese Patent Document Nos. 099256 (December/1971), 7199256 (February/1985), 7199257 (February/1985) and 210446 (May/1986). The entire disclosure of each of said patents, application and patent documents is incorporated by reference herein for all purposes.

SUMMARY OF THE INVENTION

We have discovered, in accordance with the present invention, that the presence of one or more compounds containing a metal atom linked to an oxygen atom, in particular a tin (II) atom linked to an oxygen atom, for example a tin (II) salt of a carboxylic acid, a tin (II) salt of an oxoacid of phosphorus, tin (II) oxide (SnO), or zinc oxide (ZnO), can have a very beneficial effect upon certain polyester compositions. In particular, such a compound can reduce the flammability of the composition and/or reduce the smoke generated by it when burned. This is especially useful when the composition is in the form of an electrically insulating coating around a wire.

In one aspect, this invention provides a shaped article which is composed of a composition which comprises:
(a) 50 to 85% by weight of a polymeric component which comprises
  (i) 60 to 94%, based on the weight of the polymeric component, of an aromatic polyester, preferably polybutylene terephthalate,
  (ii) 3 to 20%, based on the weight of the polymeric component, of at least one aliphatic polyester, preferably polycaprolactone, and
  (iii) 3 to 20%, based on the weight of the polymeric component, of at least one thermoplastic elastomer, preferably a thermoplastic elastomer containing polyester blocks;
  the ingredients (i), (ii) and (iii) constituting 80 to 100% by weight of the polymeric component; and
(b) 15 to 45% by weight of at least one additive compound which contains a divalent tin atom and an oxygen atom linked to the divalent tin atom, preferably SnO.

BRIEF DESCRIPTION OF THE DRAWING

The invention is illustrated in the drawing, in which the FIGURE is a cross-section through an insulated wire which is surrounded by insulating coatings 4, 6, and 8, at least one of which coatings is composed of a composition according to the first, second or third preferred aspect of the invention.

DETAILED DESCRIPTION OF THE INVENTION

Figure 1:
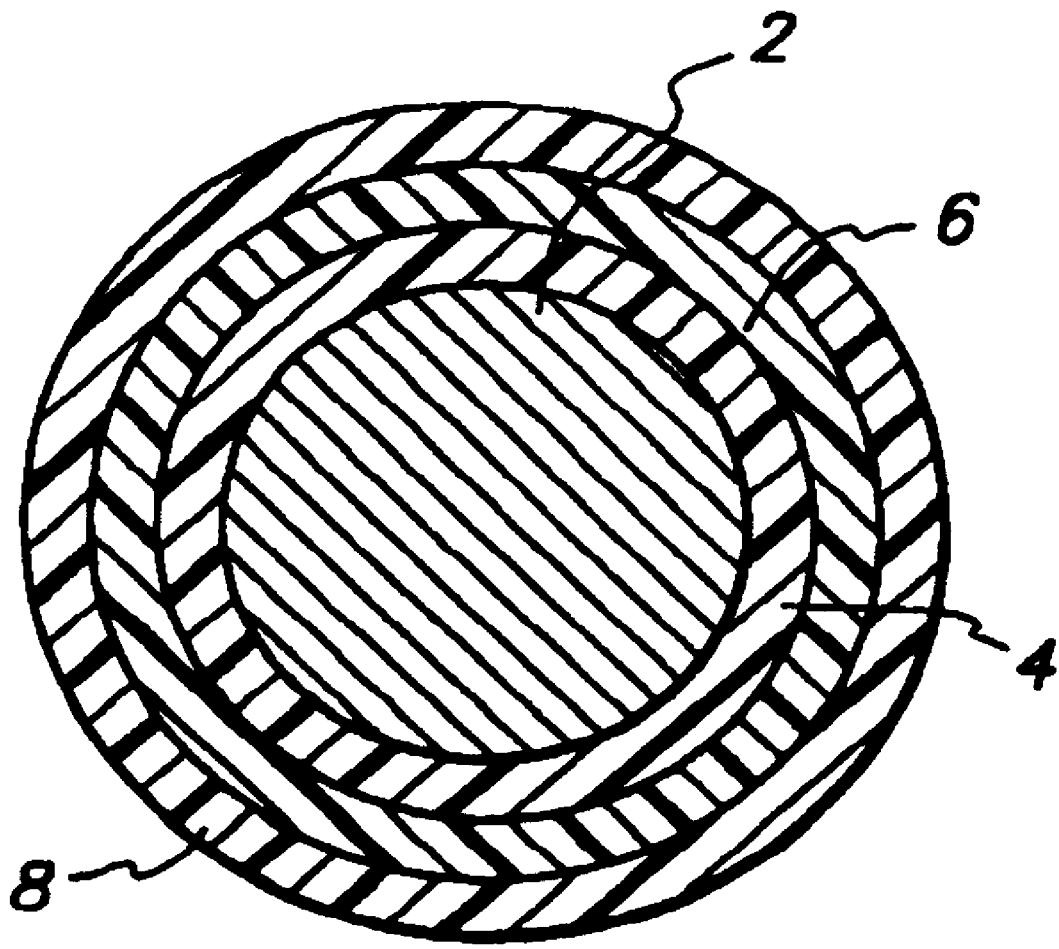

The invention is chiefly described herein by reference to thermoplastic polyester compositions which can be melt shaped, preferably melt extruded around a conductor, e.g. a solid or stranded wire, to provide an insulating coating around the wire. The term "coating" is used herein to denote a coating which is the sole insulating coating around the conductor; a coating which is one of several insulating coatings around the conductor (the polyester composition being the innermost coating, or the outermost coating, or an intermediate coating, or two or more of these coatings); or an insulating jacket around two or more conductors each having an individual insulating coating around it. However, it is to be understood that the invention is also applicable to other melt-shaped configurations, e.g. tubing and molded parts, and to compositions which can be shaped in other ways, and to compositions whose prime function is not to provide electrical insulation.

The polyester compositions contain a polymeric component which comprises at least one aromatic polyester, preferably poly (1,4-butylene terephthalate), which is often referred to herein as PBT. Suitable aromatic polyesters include those disclosed in the documents referred to above and incorporated herein by reference and those disclosed in U.S. Pat. No. 5,081,176, the disclosure of which is incorporated herein by reference. The aromatic polyester is preferably free from halogen. The aromatic polyester can alternatively or additionally be present as a block in a block copolymer, e.g. a thermoplastic elastomer. Examples of such copolymers include copolyester esters and copolyether esters, e.g. the polymers sold under the trade names Hytrel (du Pont) and Arnitel (Akzo), and graft copolymers comprising an aromatic polyester backbone, e.g. a polyalkylene terephthalate backbone, and polymeric side chains which are grafted to the backbone and which comprise units derived from addition polymerization of a monomer containing ethylenic unsaturation, as disclosed in PCT (International) Application No. WO 93/08234. The polymeric component also contains other polymers, including aliphatic polyesters, (preferably polycaprolactone) and thermoplastic elastomers, and optionally polyolefins, said other polymers preferably being compatible with the aromatic polyester and preferably having a solubility parameter which differs by at most 1.5 from the solubility parameter of the aromatic polyester (the Solubility Parameters being measured by the procedure described in Polymer Handbook, edited by Brandrup and Immergut, 2nd Edition, pages IV 339 to 339). Such other polymers, preferably are present in amounts less than 50%, particularly less than 30%, especially less than 20%, based on the weight of the polymeric component; and are preferably free from halogen. Other polymers which can be present are disclosed in the documents incorporated herein by reference, in particular U.S. Pat. No. 4,332,855.

The polymeric component comprises (A) 60–94%, preferably 70–90%, especially 75–85%, of a thermoplastic aromatic polyester component, especially PBT, (B), 3–20%, preferably 5–15%, particularly 6–10%, of at least one aliphatic polyester, especially polycaprolactone; and (C) 3–20%, preferably 5–15%, particularly 6–10%, of a thermoplastic elastomer, preferably an aromatic polyester thermoplastic elastomer, e.g. Arnitel™ or Hytrel™, these percentages being by weight based on the combined weights of (A), (B) and (C). The ingredients (A), (B) and (C) constitute 80–100%, particularly 90–100%, by weight of the polymeric component. In this specification, parts and percentages are by weight unless otherwise noted. Ingredient (A) preferably contains 70 to 100%, particularly 85 to 100%, of PBT. Other polymers which may be present as (A), or part of (A), include polyethylene terephthalate. Compositions comprising a polymeric component as defined above show remarkably good insulation resistance, particularly at elevated temperatures, e.g. at 60° C., and/or remarkably good heat aging properties, in particular in their retention of elongation and tensile strength when aged at elevated temperatures, e.g. for 168 hours at 150° C. These compositions, in the form of a coating on a wire, retain 50% of their elongation and 80% of their tensile strength (at room temperature) after aging for 168 hours at 150° and preferably at 180° C. These improved properties apparently result from the addition to ingredient (A) of both ingredient (B) and ingredient (C), and make it possible for compositions containing the novel polymeric component to include relatively large quantities of additives which improve flame retardance and/or smoke suppression without unacceptable loss of insulation resistance and/or elongation and tensile strength. This is especially important for the insulation of wires to be used in automobiles, trains, trams and other transit vehicles, and in other uses where insulated wires are subject to high ambient temperatures.

The additive compounds used in accordance with this invention are divalent tin compounds which are linked to an oxygen atom. The linkage can be covalent or ionic or both; thus the compounds of tin with carboxylic acids and oxoacids of phosphorus are referred to herein as salts, but those skilled in the art will recognize that such compounds can alternatively be regarded as complexes or chelates.

Tin (II) oxide provides excellent results. The average particle size of the tin (II) oxide is preferably less than 10 microns, particularly less than 5 microns. However, tin (II) oxide suffers from the disadvantage that it is dark in color, making shaped articles of compositions containing tin (II) oxide difficult to pigment and/or to mark (and, to many, unattractive in appearance). The same is true of mixed tin oxides containing substantial amount of SnO, e.g. $Sn_3O_4$. This disadvantage can be mitigated by means of an outer polymeric jacket which is white in color, but this is an expense preferably avoided. In many cases, therefore, it is preferred to use a tin (II) compound which, either alone or in combination with other conventional pigments, e.g. $TiO_2$, result in a polymeric coating having a light, e.g. white, color.

The divalent tin can be present, for example, as the cation in a salt formed with an organic carboxylic acid or with an oxoacid of phosphorus. Suitable carboxylic acids include oxalic acid, alkyl carboxylic acids (including substituted alkyl, e.g. aralkyl, carboxylic acids) and aryl carboxylic acids (including substituted aryl, e.g. alkaryl, carboxylic acids). Preferably the tin atom forms part of a ring structure with two carboxylate groups which are adjacent to each other in a dicarboxylic acid, for example oxalic acid, or an aryl carboxylic acid containing (i) two carboxyl groups attached to adjacent carbon atoms of an aromatic ring (for example phthalic acid or pyromellitic acid) or (ii) two carboxyl groups attached to carbon atoms which form part of adjacent aromatic rings in a fused ring system and which are separated by a single carbon atom forming a part of both rings. However, the tin (II) compound can also be part of a polymer comprising repeating units of the formula

where R is an organic radical.

The divalent tin can be present as part of a compound which is capable of further oxidation, e.g. as the cation in a salt formed with an oxoacid of phosphorus which is capable of further oxidation (often referred to as a lower oxoacid), e.g. an oxoacid containing at least one hydrogen atom linked directly to the phosphorus atom. Tin (II) phosphite, $SnHPO_3$, is an example of such an additive compound.

Especially when the additive compound is a metal oxide, it is preferably free of water of hydration, (i.e. water which can be removed by heating).

The amount of the additive compound is selected to provide the desired level of improved flame retardance and/or smoke reduction without unacceptable impairment of other physical and/or electrical properties. The amount is generally 15 to 45%, especially 15 to 25%, by weight of the composition. The additive compound can be the sole ingredient which provides flame retardance and/or smoke suppression to the composition.

Particularly preferred compositions for use in the invention contain 15–45%, particularly 15–25%, of a tin (II) compound, particularly tin (II) oxide and/or tin (II) oxalate, and a polymeric component which consists essentially of (a) PBT, (b) a mixture of (i) PBT and (ii) an aliphatic polyester, preferably polycaprolactone, the aliphatic polyester preferably being present in amount 10–20%, based on the weight of the composition, (c) a mixture of (i) PBT and (ii) a thermoplastic elastomer containing polyester blocks, e.g. "THytrel" or "Arnitel", the thermoplastic elastomer preferably being present in amount 10–20% based on the weight of the composition, or (d) a mixture of (i) PBT, (ii) an aliphatic polyester, preferably polycaprolactone, preferably present in amount 5–10%, and (iii) a thermoplastic elastomer containing polyester blocks, e.g. "Hytrel" or "Arnitel", preferably present in amount 5–10%.

The novel compositions used in this invention can also contain other ingredients, for example those disclosed in the documents incorporated by reference herein. Such other ingredients can include known flame retardants and smoke suppressants; however, the compositions of the invention are preferably free from halogen-containing ingredients. The presence of the additive compound makes it possible to eliminate, or reduce the amount of, such known additives. Preferably, the total weight percent of the additive compound and any other additive is less than, preferably at least 3% less than, particularly at least 10% less than, the weight percent of that other additive which, in a composition which is identical except that it does not contain any additive compound according to the invention, produces the same level of flame retardance and/or smoke suppression in one of the known tests for such properties, e.g. Limiting Oxygen Index (ASTM D 2863-74), Flammability (SAE J1128 MIL-W-81044, or ASTM D 3032-84) or Smoke Generation (ASTM E 662). Thus other ingredients which can be present include phosphorus-containing flame retardants and/or $Mg(OH)_2$. The present invention makes it possible to reduce the amount of $Mg(OH)_2$ to a level which avoids the problems which otherwise arise when using $Mg(OH)_2$ and phosphorus-containing flame retardants together, in particular degradation and foaming of the polyester composition.

For many uses, the polyester compositions are preferably free from reinforcing fillers such as glass fibers. When, as is preferred, the polyester composition is in the form of a coating around a wire, the coating can be of any appropriate thickness, e.g. up to 25 mils, preferably 8–18 mils. Coatings as thin as 5 mils may be useful, particularly in conjunction with other coatings.

The invention is illustrated by the following Examples.

EXAMPLES

Examples 1–10

The ingredients and amounts thereof (in percentages by weight based on the total weight of the ingredients) set out in Table 1 below were mixed together in a Brabender, and then melt-extruded over a 20 AWG 19/32 tin-coated copper stranded wire as a coating 0.010 inch (0.025 cm) thick. The products were tested and the results are set out in the Table.

The polybutylene terephthalate (PBT) ingredient used in Examples 1–10 was Celanex 1600A available from Hoechst-Celanese. The Tone P700, Tone P767 and Tone P787 ingredients are polycaprolactones of different molecular weights available from Union Carbide. The Arnitel ingredient is a thermoplastic elastomer with polyester blocks available from AKZO. The stabilizer used in Examples 1–4 and 6–10 was a mixture of 1.75% polycarbodiimide (PCD), 1.75% of a hindered phenolic antioxidant (Irganox 1010) and 0.88% of an aliphatic phosphite (Weston 619). The stabilizer used in Example 5 was 2.2% polycarbodiimide (PCD), 2.2% of a hindered phenolic antioxidant (Irganox 1010) and 1.2% of an aliphatic phosphite (Weston 619).

The elongation and tensile tests were carried out on 3 inch (7.5 cm) samples removed from the wire and then aged at 180° C. The VW-1 tests were carried out in accordance with the UL VW-1 test, and the results are expressed in the form x/y, where y is the number of samples tested and x is the number of samples which passed the test.

The Insulation Resistance tests were carried out in accordance with ASTM D-3032 at 23° C., at 60° C. after the wire had been maintained at 60° C. for one hour, and at 60° C. after the wire had been maintained at 60° C. for 4 hours.

Examples 11–18

In Examples 11–18, the ingredients and amounts thereof (in percentages by weight based on the total weight of the composition) were mixed together in a Brabender and then pressed into slabs about 0.075 inch thick. Samples cut from the pressed slabs were tested to determine their LOI (Limiting Oxygen Index) by ASTM D 2863-74), and the Char Level of the samples which had been tested by the LOI was observed and expressed on a scale of 0 to 10, with 0 indicating that the sample showed no char or expansion and 10 including an extensively expanded and charred residue.

TABLE 1

| Ingredients | 1* | 2* | 3 | 4 | 5 | 6 | 7 | 8 | 9 | 10 |
|---|---|---|---|---|---|---|---|---|---|---|
| PBT | 61.62 | 65.62 | 64.62 | 65.62 | 64.4 | 65.62 | 65.62 | 65.62 | 65.62 | 65.67 |
| Tone P 700 | 14 | 10 | 9 | 5 | 5 | — | — | 5 | 5 | 5 |
| Tone P 767 | — | — | — | — | — | 5 | — | — | — | — |
| Tone P 787 | — | — | — | — | — | — | 5 | — | — | — |
| Arnitel | — | — | 5 | 5 | 5 | 5 | 5 | 5 | 5 | 5 |
| SnO | 20 | 20 | 20 | 20 | 20 | 20 | 20 | — | — | 20 |
| SnO (dried) | — | — | — | — | — | — | — | 20 | — | — |
| SnO (ground) | — | — | — | — | — | — | — | — | 20 | — |
| Stabilizer | 4.38 | 4.38 | 4.38 | 4.38 | 5.6 | 4.38 | 4.38 | 4.38 | 4.38 | 4.38 |
| TESTS VW-1 | 0/3 | 2/4 | 3/4 | 3/3 | 4/5 | 4/5 | 2/4 | 3/3 | 3/3 | 3/3 |
| Elongation Orig. % | 327 | 236 | 363 | 345 | 361 | 317 | 345 | 371 | 397 | — |
| % of original elongation retained after | | | | | | | | | | |
| 62 hrs | 9 | 52 | 52 | 61 | 81 | 101 | 73 | 32 | 49 | — |
| 121 hrs | 10 | 22 | 26 | 33 | 10 | 77 | 44 | 3 | 50 | — |
| 184 hrs | 24 | 26 | 3 | 3 | 3 | 9 | 3 | 0 | 50 | — |
| 234 hrs | 3 | 5 | 0 | 0 | 0 | 0 | 0 | 0 | 53 | — |
| Tensile Strength | | | | | | | | | | |
| % of original tensile strength retained after | | | | | | | | | | |
| 62 hrs | 102 | 80 | 100 | 88 | 72 | 88 | 88 | 76 | 71 | — |
| 121 hrs | 91 | 79 | 80 | 71 | 69 | 94 | 73 | 53 | 65 | — |
| 184 hrs | 67 | 75 | 81 | 71 | 35 | 90 | 24 | 0 | 65 | — |
| 234 hrs | 76 | 64 | 0 | 0 | 0 | 0 | 0 | 0 | 71 | — |
| Insulation Resistance Mohm-kft (Mohm-km) | | | | | | | | | | |
| at 23° C. | 1200 (365) | 2400 (731) | 2400 (731) | 4050 (1234) | 4500 (1371) | 5400 (1646) | 5400 (1646) | 5400 (1646) | 4500 (1371) | — |
| at 60° C. after 1 hr | 2.5 (0.8) | 6.0 (1.8) | 4.8 (1.5) | 7.8 (2.4) | 12.6 (3.8) | 12.0 (3.6) | 10.5 (3.2) | 13.5 (4.1) | 15.9 (4.8) | — |
| at 60° C. after 4 hrs | 2.5 (0.8) | 7.8 (2.4) | 6.0 (1.8) | 9.6 (2.9) | 14.1 (4.3) | 12.0 (3.6) | 11.7 (3.6) | 12.6 (3.8) | 15.0 (4.6) | — |

TABLE 2

| Ingredients | Example No. | | | | | | | | |
| --- | --- | --- | --- | --- | --- | --- | --- | --- | --- |
| | 11* | 12 | 13 | 14 | 15 | 16 | 17* | 18* | 19* |
| PBT (Celanex 1600A) | 100 | 70.0 | 70.5 | 80.0 | 70.0 | 70.0 | 77.6 | 77.6 | 70.0 |
| Tin (II) oxalate | — | 30 | — | — | — | — | — | — | — |
| Tin (II) phosphite | — | — | 29.5 | — | — | — | — | — | — |
| Tin (II) oxide | — | — | — | 20.0 | — | — | — | — | — |
| Tin (II) pyromellitate | — | — | — | — | 30.0 | — | — | — | — |
| Tin (II) phthalate | — | — | — | — | — | 30.0 | — | — | — |
| Tin (II) sulfide | — | — | — | — | — | — | 22.4 | — | — |
| Tin (IV) oxide | — | — | — | — | — | — | — | 22.4 | — |
| Tin (II) pyrophosphate | — | — | — | — | — | — | — | — | 30.0 |
| TESTS | | | | | | | | | |
| LOI | 20.5 | 35.0 | 32.5 | 29.5 | 26.5 | 23.5 | 21.0 | 19.0 | 18.5 |
| Char Level | <1 | 10 | 8 | 10 | 10 | 10 | <1 | <1 | <1 |

*Examples 1, 2, 11, 17, 18 and 19 are comparative examples not in accordance with the invention

What is claimed is:

1. A shaped article which is composed of a composition which comprises:
   (a) 50 to 85% by weight of a polymeric component which comprises
      (i) 60 to 94%, based on the weight of the polymeric component, of an aromatic polyester,
      (ii) 3 to 20%, based on the weight of the polymeric component, of at least one aliphatic polyester, and
      (iii) 3 to 20%, based on the weight of the polymeric component, of at least one thermoplastic elastomer, the ingredients (i), (ii) and (iii) constituting 80 to 100% by weight of the polymeric component, and
   (b) 15 to 45% by weight of at least one additive compound which contains a divalent tin atom and an oxygen atom linked to the divalent tin atom.

2. An article according to claim 1 wherein the additive compound comprises SnO.

3. An article according to claim 1 wherein the aromatic polyester is polybutylene terephthalate.

4. An article according to claim 1 wherein the aliphatic polyester is polycaprolactone.

5. An article according to claim 1 wherein the thermoplastic elastomer is a thermoplastic elastomer containing polyester blocks.

6. An article according to claim 1 which is in the form of an electrically insulating coating around a wire.

7. A shaped article composed of a polymeric composition which comprises
   (a) 50 to 85% by weight of a polymeric component comprising
      (i) 60 to 94%, based on the weight of the polymeric component, of polybutylene terephthalate,
      (ii) 3 to 20%, based on the weight of the polymeric component, of polycaprolactone, and
      (iii) 3 to 20%, based on the weight of the polymeric component, of at least one thermoplastic elastomer containing polyester blocks, the ingredients (i), (ii) and (iii) constituting 80 to 100% by weight of the polymeric component, and
   (b) 15 to 45% by weight of at least one tin compound which contains a divalent tin atom and an oxygen atom linked to the divalent tin atom.

8. A shaped article according to claim 7 wherein the polymeric component comprises
   (i) 70 to 90%, based on the weight of the polymeric component, of polybutylene terephthalate,
   (ii) 5 to 15%, based on the weight of the polymeric component, of polycaprolactone, and
   (iii) 5 to 15%, based on the weight of the polymeric component, of the thermoplastic elastomer containing polyester blocks.

9. A shaped article according to claim 7 wherein the tin compound is at least one of SnO, tin (II) phthalate, tin (II) pyromellitate, tin (II) oxalate, and tin (II) phosphite.

10. An electrically insulating coating which surrounds a wire and is a melt-extruded composition which comprises
    (a) 50 to 85% by weight of a polymeric component which comprises
       (i) 60 to 94%, based on the weight of the polymeric component, of polybutylene terephthalate,
       (ii) 3 to 20%, based on the weight of the polymeric component, of polycaprolactone, and
       (iii) 3 to 20%, based on the weight of the polymeric component, of at least one thermoplastic elastomer containing polyester blocks, the ingredients (i), (ii) and (iii) constituting 80 to 100% by weight of the polymeric component, and
    (b) 15 to 45% by weight of at least one additive compound which contains a divalent tin atom and an oxygen atom linked to the divalent tin atom.

11. An insulating coating according to claim 10 wherein the tin compound is SnO.

12. An insulating coating according to claim 10 wherein the tin compound is at least one of tin (II) phthalate, tin (II) pyromellitate, tin (II) oxalate and tin (II) phosphite.

* * * * *